US007772920B1

(12) United States Patent
Anderson et al.

(10) Patent No.: US 7,772,920 B1
(45) Date of Patent: Aug. 10, 2010

(54) LOW THERMAL HYSTERESIS BANDGAP VOLTAGE REFERENCE

(75) Inventors: Michael B. Anderson, Colorado Springs, CO (US); Robert C. Dobkin, Monte Sereno, CA (US); Brendan John Whelan, Discovery Bay, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 12/474,938

(22) Filed: May 29, 2009

(51) Int. Cl.
*G06F 1/10* (2006.01)

(52) U.S. Cl. ....................................... 327/539; 327/513

(58) Field of Classification Search ................. 327/513, 327/539; 323/313
See application file for complete search history.

(56) References Cited

U.S. PATENT DOCUMENTS 3,887,863 A 6/1975 Brokaw
4,255,672 A * 3/1981 Ohno et al. .................. 326/47
4,447,784 A 5/1984 Dobkin
5,440,305 A 8/1995 Signore et al.
6,020,731 A * 2/2000 Shinohara .................. 323/316
6,172,555 B1 * 1/2001 Gusinov .................... 327/539
6,232,828 B1 * 5/2001 Smith et al. ................ 327/539
6,611,043 B2 * 8/2003 Takiguchi .................. 257/565
6,933,770 B1 * 8/2005 Ranucci .................... 327/539
7,118,273 B1 * 10/2006 Schnaitter ................. 374/168
7,193,454 B1 * 3/2007 Marinca .................... 327/539
7,372,244 B2 * 5/2008 Marinca .................... 323/316
2003/0006831 A1 * 1/2003 Coady ...................... 327/539
2007/0145534 A1 * 6/2007 Murakami ................... 257/566
2008/0315856 A1 * 12/2008 Takiba et al. ............... 323/313
2009/0153125 A1 * 6/2009 Arai ....................... 323/313

* cited by examiner

*Primary Examiner*—Lincoln Donovan
*Assistant Examiner*—Thomas J Hiltunen
(74) *Attorney, Agent, or Firm*—McDermott Will & Emery LLP

(57) ABSTRACT

A first and a second group of individual transistors in a voltage reference may collectively function as a first and a second composite transistor with a first and a second emitter area equal to the combined areas of the emitters of the first and the second groups of individual transistors, respectively. The second emitter area may be larger than the first emitter area. The stability of the reference voltage may depend upon the stability of the ratio between the first emitter area and the second emitter area. The first group of individual transistors may not be at the center of an arrangement of the second group of individual transistors. The constant reference voltage may vary due to thermal hysteresis by less than 200 parts per million over a 40 degree centigrade temperature range.

21 Claims, 5 Drawing Sheets

| | | |
|---|---|---|
| Q2 | Q2 | Q2 |
| Q2 | Q1 | Q2 |
| Q2 | Q2 | Q2 |

*FIG. 3 (Prior Art)*

| | | | | | | |
|---|---|---|---|---|---|---|
| | | | Q1 | | | |
| | Q2 | Q2 | Q2 | Q2 | Q2 | |
| | Q2 | Q2 | Q2 | Q2 | Q2 | |
| Q1 | Q2 | Q2 | Q2 | Q2 | Q2 | Q1 |
| | Q2 | Q2 | Q2 | Q2 | Q2 | |
| | Q2 | Q2 | Q2 | Q2 | Q2 | |
| | | | Q1 | | | |

*FIG. 4*

| | | | | | | | | | | |
|---|---|---|---|---|---|---|---|---|---|---|
| | | | Q1 | | Q1 | | Q1 | | | |
| | Q2 | Q2 | Q2 | Q2 | Q2 | Q2 | Q2 | Q2 | Q2 | |
| | Q2 | Q2 | Q2 | Q2 | Q2 | Q2 | Q2 | Q2 | Q2 | |
| Q1 | Q2 | Q2 | Q2 | Q2 | Q2 | Q2 | Q2 | Q2 | Q2 | Q1 |
| | Q2 | Q2 | Q2 | Q2 | Q2 | Q2 | Q2 | Q2 | Q2 | |
| Q1 | Q2 | Q2 | Q2 | Q2 | Q2 | Q2 | Q2 | Q2 | Q2 | Q1 |
| | Q2 | Q2 | Q2 | Q2 | Q2 | Q2 | Q2 | Q2 | Q2 | |
| Q1 | Q2 | Q2 | Q2 | Q2 | Q2 | Q2 | Q2 | Q2 | Q2 | Q1 |
| | Q2 | Q2 | Q2 | Q2 | Q2 | Q2 | Q2 | Q2 | Q2 | |
| | Q2 | Q2 | Q2 | Q2 | Q2 | Q2 | Q2 | Q2 | Q2 | |
| | | | Q1 | | Q1 | | Q1 | | | |

*FIG. 5*

| | | | | | | | | | | |
|---|---|---|---|---|---|---|---|---|---|---|
| | | | Q1 | Q3 | Q1 | Q3 | Q1 | | | |
| | Q2 | Q2 | Q2 | Q2 | Q2 | Q2 | Q2 | Q2 | Q2 | |
| | Q2 | Q2 | Q2 | Q2 | Q2 | Q2 | Q2 | Q2 | Q2 | |
| Q1 | Q2 | Q2 | Q2 | Q2 | Q2 | Q2 | Q2 | Q2 | Q2 | Q1 |
| Q3 | Q2 | Q2 | Q2 | Q2 | Q2 | Q2 | Q2 | Q2 | Q2 | Q3 |
| Q1 | Q2 | Q2 | Q2 | Q2 | Q2 | Q2 | Q2 | Q2 | Q2 | Q1 |
| Q3 | Q2 | Q2 | Q2 | Q2 | Q2 | Q2 | Q2 | Q2 | Q2 | Q3 |
| Q1 | Q2 | Q2 | Q2 | Q2 | Q2 | Q2 | Q2 | Q2 | Q2 | Q1 |
| | Q2 | Q2 | Q2 | Q2 | Q2 | Q2 | Q2 | Q2 | Q2 | |
| | Q2 | Q2 | Q2 | Q2 | Q2 | Q2 | Q2 | Q2 | Q2 | |
| | | | Q1 | Q3 | Q1 | Q3 | Q1 | | | |

*FIG. 7*

| | | | | | | | | |
|---|---|---|---|---|---|---|---|---|
| Q1 | Q2 | Q2 | Q2 | Q2 | Q2 | Q2 | Q2 | Q1 |

*FIG. 8*

LOW THERMAL HYSTERESIS BANDGAP VOLTAGE REFERENCE

BACKGROUND

1. Technical Field

This disclosure relates to voltage reference circuits, including bandgap voltage reference circuits, in which changes in the ratio between the emitter areas of two transistors in the circuit may adversely affect the stability of the reference voltage.

2. Description of Related Art

A voltage reference circuit may provide a substantially constant output voltage, notwithstanding changes in input voltage, temperature, and/or other conditions.

The stability of the output voltage may depend upon the stability of the ratio between the emitter areas of two transistors, one of which may have a substantially larger emitter area than the other. That ratio, however, may be affected by thermal hysteresis—mechanical stresses imposed unequally by temperature changes on different portions of the transistors. This may be particularly true when the voltage reference circuit is contained on a single die.

Efforts have been made to compensate for the adverse effects of thermal hysteresis. For example, the transistor with the smaller emitter area has been centered within a group of individual transistors that collectively function as the transistor with the larger emitter area. However, this approach may not solve the problem for certain types of stresses.

SUMMARY

A circuit on a single die may be configured to generate a substantially constant reference voltage. The circuit may include an arrangement of a first and a second group of individual transistors. The first group of individual transistors may collectively function as a first composite transistor in the circuit with a first emitter area equal to the combined areas of the emitters of the first group of individual transistors. The second group of individual transistors may collectively function as a second composite transistor in the circuit with a second emitter area that is equal to the combined areas of the emitters of the second group of individual transistors. The second emitter area may be greater than the first emitter area. The stability of the constant reference voltage may depend upon the stability of the ratio between the first emitter area and the second emitter area. The first group of individual transistors may not be at the center of an arrangement of the second group of individual transistors.

The constant reference voltage may vary due to thermal hysteresis by less than 200 parts per million over a 40 degree centigrade temperature range.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 3 illustrates a prior art, two-dimensional arrangement of individual transistors in which an individual Q1 transistor is the 1x $\Delta V_{BE}$ in a bandgap reference circuit, a group of individual Q2 transistors is the Nx $\Delta V_{BE}$ in the bandgap reference circuit, and the individual Q1 transistor is centered within the group of individual Q2 transistors.

FIG. 4 illustrates a two-dimensional arrangement of individual transistors in a voltage reference in which a smaller group of individual Q1 transistors is not at the center of a larger group of individual Q2 transistors.

FIG. 5 illustrates a two-dimensional arrangement of individual transistors in a voltage reference in which a smaller group of individual Q1 transistors is not at the center of a larger group of individual Q2 transistors and in which the number of individual Q1 transistors is substantially larger than in FIG. 4.

FIG. 7 illustrates a two-dimensional arrangement of individual transistors in a voltage reference in which a smaller group of individual Q1 transistors and a smaller group of individual Q3 transistors are both not at the center of a larger group of individual Q2 transistors.

FIG. 8 illustrates a one-dimensional arrangement of individual transistors in a voltage reference in which a smaller group of individual Q1 transistors is not at the center of a larger group of individual Q2 transistors.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

A voltage reference may provide a substantially constant output voltage, notwithstanding changes in input voltage, temperature, and/or other parameters.

The stability of the output voltage may depend upon the stability of the ratio between the emitter areas of two transistors, one of which may have a substantially larger emitter area than the other. That ratio, however, may be affected by thermal hysteresis—mechanical stresses imposed unequally by temperature changes on different portions of the emitter areas. This may be particularly true when the voltage reference circuit is contained on a single die.

Figure 1:
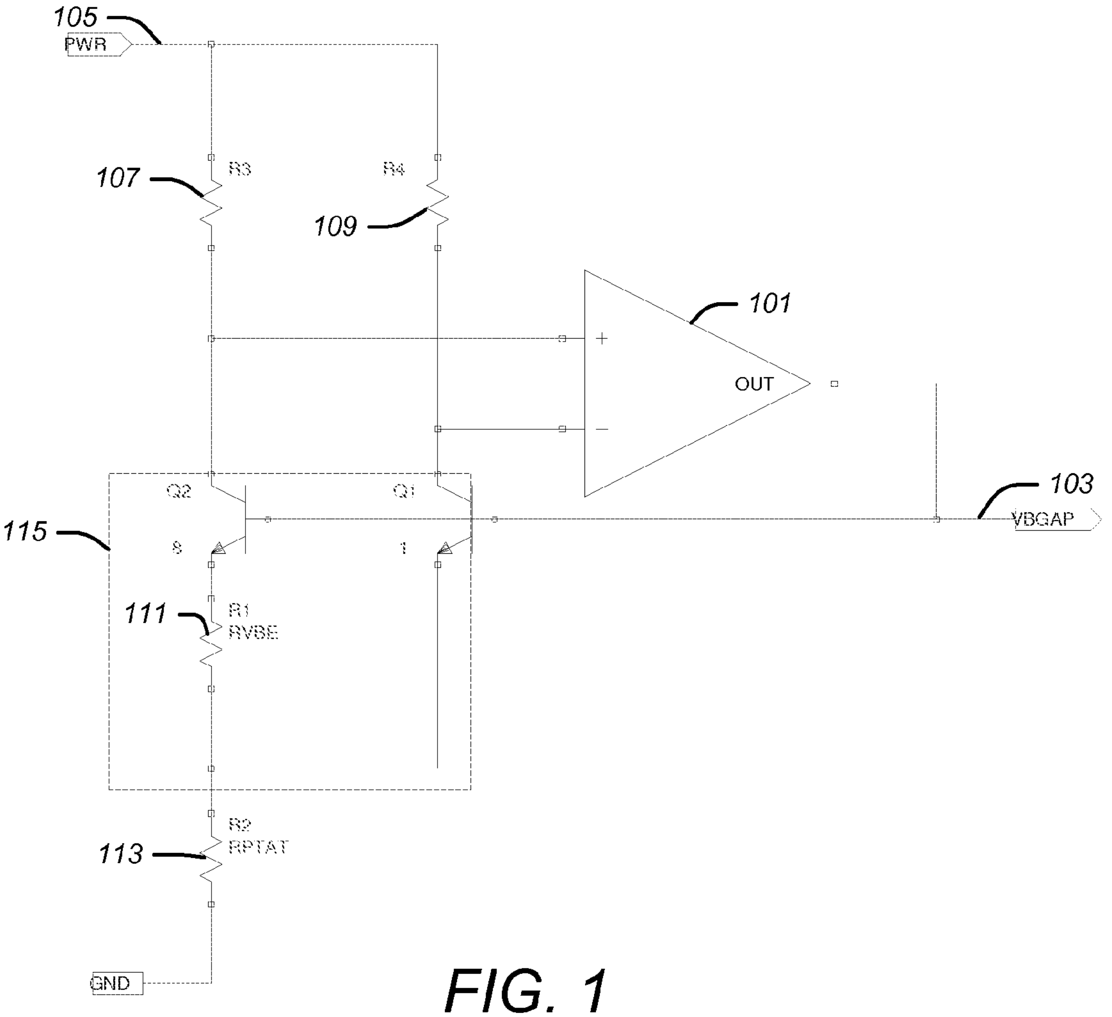
FIG. 1 illustrates a bandgap voltage reference circuit using a Brokaw cell.

FIG. 1 illustrates a bandgap voltage reference circuit using a Brokaw cell.

As illustrated in FIG. 1, the circuit may include an amplifier 101 which provides a substantially constant output voltage 103, notwithstanding variation in an input voltage 105. The circuit may include resistors 107, 109, 111, and 113. The circuit may also include a differential base-to-emitter voltage generator circuit ("$\Delta V_{BE}$") 115 which may include a transistor Q1 and a transistor Q2. The transistor Q1 may also function as a base-to-emitter voltage generator ("$V_{BE}$").

The emitter area of the transistor Q1 may be substantially less than the emitter area of the transistor Q2. The stability of the output voltage 103 may depend upon the stability of the ratio between these two emitter areas.

The transistor Q2 may be a composite transistor made up of a group of individual transistors. The ratio between the emitter area of the combined areas of the emitters in the group of individual transistors which make up the composite transistor Q2 and the emitter area of the transistor Q2 may be indicated on a schematic diagram. An example of this is illustrated in FIG. 1. It illustrates an 8:1 ratio by an "8" next to the transistor Q2 and a "1" next to the composite transistor Q1. In such a configuration, the individual Q1 transistor may be referred to as the 1x $\Delta V_{BE}$ transistor and the composite transistor Q2 may be referred to as the Nx $\Delta V_{BE}$, transistor, where N represents the numerator in this ratio.

As indicated above in connection with voltage references in general, the stability of the output voltage 103 may depend upon the stability of the ratio between the emitter area of the transistor Q1 and the combined emitter area of the composite transistor Q2. As also indicated above, that ratio may be affected by thermal hysteresis—mechanical stresses imposed unequally by temperature changes on different portions of the emitter areas that comprise these transistors. This may be particularly true when the voltage reference circuit is contained on a single die.

Figure 2:
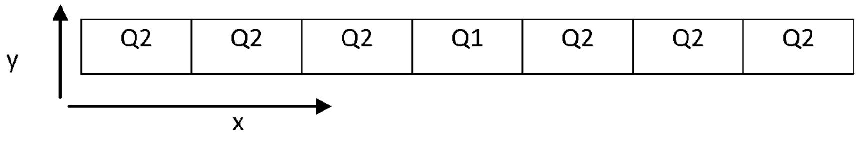
FIG. 2 (Prior Art)
FIG. 2 illustrates a prior art, one-dimensional arrangement of individual transistors in which an individual Q1 transistor is the 1x $\Delta V_{BE}$ in a bandgap reference circuit, a group of individual Q2 transistors is the Nx $\Delta V_{BE}$ in the bandgap reference circuit, and the individual Q1 transistor is centered within the group of individual Q2 transistors.

FIG. 2 illustrates a prior art, one-dimensional arrangement of individual transistors in which an individual Q1 transistor is the 1x $\Delta V_{BE}$ in a bandgap reference circuit, a group of individual Q2 transistors is the Nx $\Delta V_{BE}$ in the bandgap reference circuit, and the individual Q1 transistor is centered within the group of individual Q2 transistors.

The configuration of the transistors Q1 and Q2 in FIG. 2 may help reduce thermal hysteresis in the output voltage 103 if the gradient of the mechanical stress is linear in the x direction, such that the average stress impressed on Q1 and Q2 are nearly equal. If there is a nonlinear component to the gradient, however, such that the average stress on Q1 is different than the average stress on Q2, the ratio between the emitter areas of Q1 and Q2 may change, thus adversely affecting the stability of the output voltage 103.

FIG. 3 illustrates a prior art, two-dimensional arrangement of individual transistors in which an individual Q1 transistor is the 1x $\Delta V_{BE}$ in a bandgap reference circuit, a group of individual Q2 transistors is the Nx $\Delta V_{BE}$ in the bandgap reference circuit, and the individual Q1 transistor is centered within the group of individual Q2 transistors.

The configuration illustrated in FIG. 3 may help compensate when there is a nonlinear component to the stress gradient by reducing the total width or length of the array for a given number of transistors as compared to the configuration illustrated in FIG. 2. However, the configuration illustrated in FIG. 3 may require the stress gradient to be completely linear and/or to be centered around the Q1 transistor in both the X- and Y-directions. These conditions may not always be present. When they are not, the output voltage may be adversely affected FIG. 4 illustrates a two-dimensional arrangement of individual transistors in a voltage reference in which a smaller group of individual Q1 transistors is not at the center of a larger group of individual Q2 transistors.

The arrangement of individual transistors which is illustrated in FIG. 4 may be used for the Q1 and Q2 which are illustrated in FIG. 1 or in any other voltage reference circuit. It is fundamentally different from the arrangements illustrated in FIGS. 2 and 3 in that the transistor with the smaller emitter area—Q1—is not at the center of an arrangement of the composite transistor with the larger emitter area—Q2. A further difference is that the transistor with the smaller emitter area—Q1—is now also a composite transistor formed by the combination of several individual transistors. The composite transistor Q1 may be referred to as an Mx device, with the ratio of the number of individuals transistors that make up the composite transistors Q2 and Q1 being expressed as N:M.

The arrangement of individual transistors which is illustrated in FIG. 4 may have one or more additional characteristics. For example, all of the individual transistors may have substantially the same emitter area and/or may be substantially the same. The group of individual Q2 transistors may be at least six times the number of the group of individual Q1 transistors. The number of individual Q1 transistors may be four times an integer. Each adjacent pair of individual Q1 transistors may be separated by one or more of the individual Q2 transistors. The perimeter of the two-dimensional arrangement of the individual Q1 and Q2 transistors may be approximately in the shape of an oval, a circle, a rectangle, a triangle, a square, or any other shape that is substantially symmetrical about two perpendicular axes that lie within the plane of the arrangement. The individual Q1 transistors may be symmetrically arranged around the individual Q2 transistors. The group of individual transistors which make up the composite Q1 and/or composite Q2 transistors may have a common centroid. The two-dimensional arrangement of the individual transistors may be substantially centered on a single die, as illustrated by the dotted cross in FIG. 4. The arrangement which is illustrated in FIG. 4 may cause the thermal hysteresis of the output reference voltage to be less than it would be if the individual Q1 transistors were at the center of an arrangement of the individual Q2 transistors.

The ratio of individual Q2 transistors to individual Q1 transistors in FIG. 4 is 25:4. The ratio may be different, such as 50:8, 26:4, 25:8, 26:8, 50:4 or any other ratio greater than 1.

FIG. 5 illustrates a two-dimensional arrangement of individual transistors in a voltage reference in which a smaller group of individual Q1 transistors is not at the center of a larger group of individual Q2 transistors and in which the ratio of the individual Q2 to Q1 transistors and the number of individual Q1 transistors is larger than in FIG. 4.

As illustrated in FIG. 5, the ratio of individual Q2 transistors to individual Q1 transistors is 81:12. This is a larger ratio than is illustrated in FIG. 4. The number of the individual Q1 transistors is also substantially larger. Both of these differences may improve stability in the output reference voltage. Except for these differences, all of the specifications, considerations, and variations which are discussed above in connection with the individual Q1 and Q2 transistors in FIG. 4 may apply equally here. For example, a different ratio between the individual transistors used for the composite transistors Q2 and Q1 may be used, as well as a different number of individual transistors for each.

Figure 6:
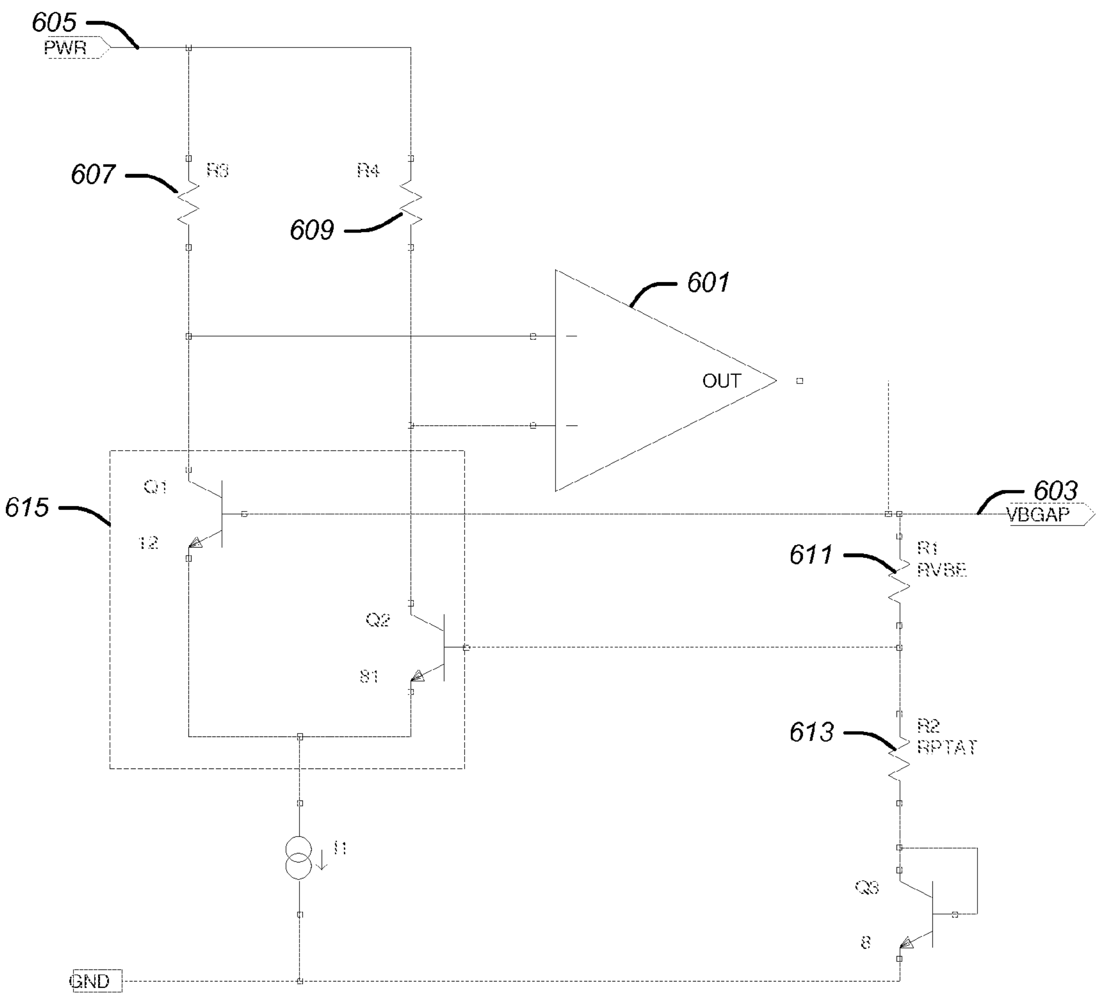
FIG. 6 illustrates a bandgap reference using Dobkin architecture.

FIG. 6 illustrates a bandgap reference using Dobkin architecture. As illustrated in FIG. 6, the bandgap reference may include an amplifier 601 which provides a substantially constant output voltage 603, notwithstanding variation in an input voltage 605. The circuit may include resistors 607, 609, 611, and 613. The circuit may also include a $\Delta V_{BE}$ generator 615 which may include a transistor Q1 and a transistor Q2. A third transistor Q3 may function as a $V_{BE}$ generator.

All of the specifications, configurations, and variations which are discussed above in connection with Q1 and Q2 in FIGS. 1, 4, and 5 may also apply to Q1 and Q2 in FIG. 6, respectively. Like Q1 in FIGS. 1, 4, and 5, moreover, the third transistor Q3 may be a composite transistor configured from a third group of individual transistors. The collective emitter area of the composite transistor Q3 may or may not similarly be less than the collective emitter area of the composite transistor Q1. The stability of the output voltage 603 may similarly depend upon the stability of the various ratios between the collective emitter areas of the composite transistors Q1, Q2, and Q3.

FIG. 7 illustrates a two-dimensional arrangement of individual transistors in a voltage reference in which a smaller group of individual Q1 transistors and a smaller group of individual Q3 transistors are both not at the center of a larger group of individual Q2 transistors. The arrangement of individual transistors which is illustrated in FIG. 7 may be used for the Q1, Q2, and Q3 transistors which are illustrated in FIG. 6 or in any other voltage reference circuit.

As illustrated in FIG. 7, the individual Q3 transistors may similarly not be at the center of an arrangement of the individual Q2 transistors. The individual Q3 transistors may also be subject to all of the specifications, configurations, and variations that are discussed above in connection with the individual Q1 transistors in both FIG. 4 and FIG. 5. For example, all of the individual transistors may have substantially the same emitter area and/or may be substantially the same. The number of the individual Q3 transistors may also vary, as well as the ratio between the number of the individual Q3 transistors and the number of the individual Q2 transistors. The ratio between the number of the individual Q3 transistors and the number of individual Q1 transistors may also vary. As illustrated in FIG. 7, moreover, the individual Q3 transistors may be symmetrically arranged around the individual Q2 transistors, and all three groups of individual transistors may have a common centroid. The perimeter of the two-dimensional arrangement of the individual Q1, Q2, and Q3 transistors may be approximately in the shape of an oval, a circle, a rectangle, a triangle, a square, or any other shape that is substantially symmetrical about two perpendicular axes that lie within the plane of the arrangement. The two-dimensional arrangement of the individual transistors may be substantially centered on a single die, as illustrated by the dotted cross in FIG. 7. As with the arrangements illustrated in FIG. 4 and FIG. 5, moreover, the arrangement of the individual transistors illustrated in FIG. 7 may cause the thermal hysteresis of the reference voltage output to be less than it would be if the group of the individual Q3 transistors were at the center of an arrangement of the group of individual Q2 transistors.

FIG. 8 illustrates a one-dimensional arrangement of individual transistors in a voltage reference in which a smaller group of individual Q1 transistors is not at the center of a larger group of individual Q2 transistors. Except for this difference in the shape of the arrangement of the individual Q1 and Q2 transistors, the individual Q1 and Q2 transistors in FIG. 8 may be subject to all of the same specifications, configurations, and variations that are discussed above in connection with the other individual Q1 and Q2 transistor embodiments.

The configuration illustrated in FIG. 8, as well as all of the other configurations of Q1 and Q2 which have been discussed, may be used in connection with a voltage reference in which the reference voltage varies due to thermal hysteresis by less than 200 parts per million over a 40, 80, or 120 degree centigrade temperature range. Such a voltage reference may also vary by less than 100 or less than 50 parts per million over one of these temperature ranges.

Figure 9:
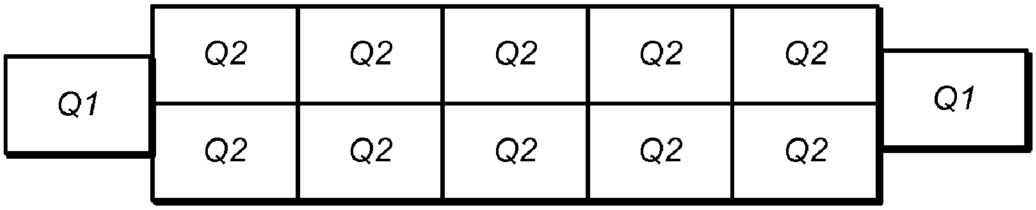
FIG. 9 illustrates a two-dimensional arrangement of individual transistors in a voltage reference in which a smaller group of individual Q1 transistors is not at the center of a larger group of individual Q2 transistors and in which there is an offset between the Q1 and Q2 transistors.
Figure 10:
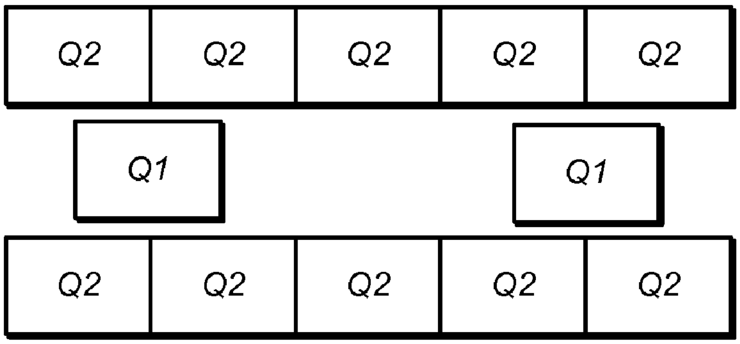
FIG. 10 illustrates a two-dimensional arrangement of individual transistors in a voltage reference in which a smaller group of individual Q1 transistors is between but not at the center of a larger group of individual Q2 transistors and in which there is an offset between the Q1 and Q2 transistors.
Figure 11:
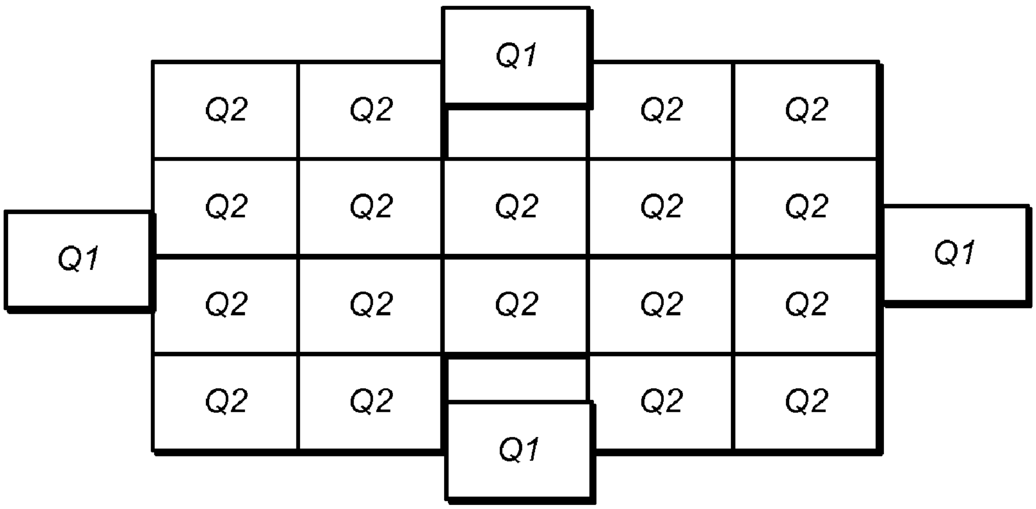
FIG. 11 illustrates a two-dimensional arrangement of individual transistors in a voltage reference in which a smaller group of individual Q1 transistors is surrounding and not at the center of a larger group of individual Q2 transistors and in which there is an offset between the Q1 and Q2 transistors.

The Q1 and Q2 transistors may also be offset from one another. For example, FIG. 9 illustrates a two-dimensional arrangement of individual transistors in a voltage reference in which a smaller group of individual Q1 transistors is not at the center of a larger group of individual Q2 transistors and in which there is an offset between the Q1 and Q2 transistors. FIG. 10 illustrates a two-dimensional arrangement of individual transistors in a voltage reference in which a smaller group of individual Q1 transistors is between but not at the center of a larger group of individual Q2 transistors and in which there is an offset between the Q1 and Q2 transistors. FIG. 11 illustrates a two-dimensional arrangement of individual transistors in a voltage reference in which a smaller group of individual Q1 transistors is surrounding and not at the center of a larger group of individual Q2 transistors and in which there is an offset between the Q1 and Q2 transistors.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the individual Q1 and Q3 (when present) transistors may be disbursed at locations in addition to or other than around the perimeter of the arrangement of individual transistors, such as within the interior of the arrangement. When the arrangement of individual transistors has corners, individual Q1 and Q3 (when present) transistors may be positioned at these corners. One or more of the individual Q1 and Q3 (when present) transistors may be placed within the center of the die.

The size of the emitter of each individual transistor, as well as the construction and type of each transistor may vary. For example, PNP transistors and/or other types of transistors may be used, in addition or instead of the NPN transistors which have been illustrated.

Different types of routing metals between transistors, other devices in the circuit, and/or other circuits may be used.

Other types of voltage reference circuits may be used in addition or instead. For example, a Widlar cell bandgap circuit may be used.

The ratio between the length and width of the various arrangements may be different. For example, the arrangement may be narrower than has been illustrated in FIGS. 4, 5, and 7, wider, or even square.

Transistors Q1, Q2 and Q3 may be not all be the same type of transistor. Or the total array may be split into physically different sections that are physically separated, such as four squares, one at each corner of the die. Further, each individual section may be of a prior type (such as FIG. 2 or FIG. 3), but when considered as a whole, they exhibit the characteristic that the aggregate Mx device is not at the center of the aggregate Nx device. Or the Mx and Nx device may not be bipolar devices, but instead any kind of device that may generate a predictable voltage over temperature, such as MOSFETs, which may generate a $\Delta V_{GS}$, or diodes of any kind, which may generate a $\Delta V_D$. Or the circuit may be used as a current reference rather than a voltage reference, such that the reference voltage is buffered and driven into a known resistance to form $I=V_{REF}/R$, or such that the current which changes proportional to temperature is combined with a current that changes in an inverse proportion to temperature, such as may be generated with $V_{BE}/R$, to form a current that is essentially invariant with temperature.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A voltage reference comprising:

a circuit on a single die configured to generate a substantially constant reference voltage, the circuit including a two-dimensional arrangement of a first and a second group of individual transistors configured such that:

the first group of individual transistors collectively function as a first composite transistor in the circuit with a first emitter area equal to the combined areas of the emitters of the first group of individual transistors; and the second group of individual transistors collectively function as a second composite transistor in the circuit with a second emitter area that is equal to the combined areas of the emitters of the second group of individual transistors and that is greater than the first emitter area, wherein:

the circuit is configured such that the stability of the constant reference voltage is dependent upon the stability of the ratio between the first emitter area and the second emitter area;

the first group of individual transistors is not at the center of an arrangement of the second group of individual transistors; and the first and second groups of individual transistors approximately share a common centroid.

2. The voltage reference of claim 1 wherein the two-dimensional arrangement includes a third group of individual transistors configured such that the third group of individual transistors collectively function as a third composite transistor in the circuit with a third emitter area that is equal to the combined areas of the emitters of the third group of individual transistors, wherein:

the circuit is configured such that the stability of the constant reference voltage is dependent upon the stability of the ratio between the third emitter area and the second emitter area; and the third group of individual transistors is not at the center of an arrangement of the second group of individual transistors.

3. A voltage reference comprising:

a circuit on a single die configured to generate a substantially constant reference voltage, the circuit including an arrangement of a first and a second group of individual transistors configured such that:

the first group of individual transistors collectively function as a first composite transistor in the circuit with a first emitter area equal to the combined areas of the emitters of the first group of individual transistors; and the second group of individual transistors collectively function as a second composite transistor in the circuit with a second emitter area that is equal to the combined areas of the emitters of the second group of individual transistors and that is greater than the first emitter area, wherein:

the circuit is configured such that the stability of the constant reference voltage is dependent upon the stability of the ratio between the first emitter area and the second emitter area;

the first group of individual transistors is not at the center of an arrangement of the second group of individual transistors;

the first and second groups of individual transistors approximately share a common centroid; and the constant reference voltage varies due to thermal hysteresis by less than 200 parts per million over a 40 degree centigrade temperature range.

4. The voltage reference of claim 1 or 3 wherein all of the individual transistors have substantially the same emitter area.

5. The voltage reference of claim 4 wherein all of the individual transistors are substantially the same.

6. The voltage reference of claim 4 wherein the second group has at least six times the number of the individual transistors in the first group.

7. The voltage reference of claim 1 or 3 wherein the number of the individual transistors in the first group is four times an integer.

8. The voltage reference of claim 1 or 3 wherein each adjacent pair of the individual transistors in the first group is separated by one or more of the individual transistors in the second group.

9. The voltage reference of claim 2 wherein each adjacent pair of the individual transistors in the first and the third groups is separated by one or more of the individual transistors in the second group.

10. The voltage reference of claim 1 or 3 wherein the perimeter of the two-dimensional arrangement of the individual transistors is approximately oval.

11. The voltage reference of claim 1 or 3 wherein the first group of individual transistors is symmetrically arranged around the second group of individual transistors.

12. The voltage reference of claim 2 wherein the first and the third groups of individual transistors are symmetrically arranged around the second group of individual transistors.

13. The voltage reference of claim 12 wherein the first, the second, and the third groups of individual transistors have a common centroid.

14. The voltage reference of claim 1 or 3 wherein the arrangement of individual transistors is substantially centered on the single die.

15. The voltage reference of claim 1 or 3 wherein the circuit includes a bandgap voltage reference circuit.

16. The voltage reference of claim 15 wherein the bandgap reference circuit includes a differential base-to-emitter voltage generator that includes both the first and the second composite transistors and a base-to-emitter voltage generator that includes the first composite transistor.

17. The voltage reference of claim 2 wherein the circuit includes a bandgap voltage reference circuit and the bandgap reference circuit includes a differential base-to-emitter voltage generator that includes both the first and the second composite transistors and a base-to-emitter voltage generator that includes the third composite transistor.

18. The voltage reference of claim 1 or 3 wherein the arrangement of the first and second groups of individual transistors causes the thermal hysteresis in the reference voltage to be less than it would be if the first group of individual transistors were at the center of an arrangement of the second group of individual transistors.

19. The voltage reference of claim 2 wherein the arrangement of the first, second and third groups of individual transistors causes the thermal hysteresis in the reference voltage to be less than it would be if the first and the third groups of individual transistors were at the center of an arrangement of the second group of individual transistors.

20. The voltage reference of claim 3 wherein the constant reference voltage varies due to thermal hysteresis by less than 200 parts per million over an 80 degree centigrade temperature range.

21. The voltage reference of claim 3 wherein the constant reference voltage varies due to thermal hysteresis by less than 200 parts per million over a 120 degree centigrade temperature range.

* * * * *